United States Patent [19]

Gilgore

[11] 4,435,979

[45] Mar. 13, 1984

[54] APPARATUS FOR TESTING VALVE ACTUATORS

[75] Inventor: William H. Gilgore, York, Pa.

[73] Assignee: Allis-Chalmers Corporation, Milwaukee, Wis.

[21] Appl. No.: 394,855

[22] Filed: Jul. 2, 1982

[51] Int. Cl.³ ............................................. G01M 19/00
[52] U.S. Cl. ................................ 73/168; 73/432 SD; 73/847; 73/432 R
[58] Field of Search .................... 73/168, 862.19, 847, 73/432 V, 432 SD, 432 K

[56] References Cited

U.S. PATENT DOCUMENTS 4,235,103 11/1980 Carter et al. ........................... 73/168

Primary Examiner—Donald O. Woodiel
Attorney, Agent, or Firm—Timothy R. Conrad

[57] ABSTRACT

An apparatus is disclosed for subjecting a test valve actuator to torque loads which simulate the torque loads an actuator would be expected to experience in field operation when opening and closing a butterfly-type valve in a fluid conduit. The apparatus includes a frame supporting both a drive shaft and a tail shaft mounted for rotation about horizontal axis of rotation. The test actuator is mounted on the frame and coupled to the drive shaft for rotating the shaft 90° about its axis. A sprocket fixed to the drive shaft is connected by a link chain to a sprocket fixed to the tail shaft. The sprockets are selected to have a 3 to 1 gear reduction ratio with the tail shaft rotating 3 degrees for each degree of rotation of the tail shaft. A mass depending from the tail shaft generates a torque load at the tail shaft equal to one third the dynamic torque load for corresponding positions of the actuator. The torque load is transmitted to the actuator through the sprockets and link chain with the torque amplified three times to approximate the dynamic torque load. A second mass, pivotally supported away from the tail shaft, is engaged and rotated as the first mass approaches a position corresponding with a valve opened position. The torque produced by the second mass together with the torque produced by the first mass equals one-third the expected seating torque load which is transmitted to the actuator and amplified three times by the sprockets and link chain to approximate the seating torque. Circuitry is disclosed for permitting repetitious operation of the apparatus to cycle the actuator from opened position to closed position and back to opened position.

4 Claims, 8 Drawing Figures

APPARATUS FOR TESTING VALVE ACTUATORS

BACKGROUND OF THE INVENTION

1. Field of the Invention

This invention relates to apparatus for testing valve actuators. More specifically, this invention relates to an apparatus for subjecting a valve actuator to dynamic and seating loads which simulate the loads an actuator would experience in opening and closing a butterfly-type valve in a fluid conduit.

2. Description of the Prior Art

In the art, butterfly valves are well known for controlling flow of a fluid through a conduit. Such valves open and close the flow of fluid by rotating a valve disc to a valve fully opened position with the disc parallel to the flow of fluid through the conduit. The valve is closed by rotating the disc 90° to a valve fully closed position with the disc at right angles to the fluid flow path. Proper sealing of the valve is maintained by providing the disc with a resilient sealing edge which is received against a smooth valve body seat (usually fabricated from stainless steel) when the disc is in the fully closed position.

Commonly, such valves are operated by electric motor driven actuators which operate to rotate the disc 90° between the valve fully opened and the valve fully closed position. While operating the valve, the actuators are subjected to varying torque loads. One such load is a dynamic torque load experienced by the actuator while rotating the disc from open to close and close to open. Another such load is a seating torque load experienced when the disc seal edge is forced against the valve seat while the valve is positioned at fully closed.

The dynamic load experienced by the actuator varies with the angular position of the disc within the conduit. For example, when the valve is at fully opened position with the disc in parallel to the fluid flow (conveniently referred to as 0° position), little or no dynamic torque load is experienced. As the valve moves toward fully closed position (with the position of the valve measured as the lesser included angle between the disc and the disc opened position), the dynamic torque load increases to a maximum positive dynamic torque load. Typically, the maximum dynamic torque load occurs when the valve is between the 20° and 40° position with 30° representing the most frequently occurring position at which maximum dynamic torque load is experienced. As the valve moves to about a 60° position, the dynamic torque load decreases to zero. After the 60° position, the dynamic torque load continues to decrease with a negative value. This negative torque load occurs by reason of the fluid flow urging the disc toward the valve seat. During this period of valve operation, the actuator must work to resist the forces of the fluid flow which would otherwise tend to force the disc to impact the valve seat with such force as might damage the seat.

When the valve proceeds to nearly the fully closed position (for example, at approximately an 80° position), the actuator must work to drive the disc seal edge against the valve seat resulting in a suddenly increasing seating torque load which reaches a maximum positive value at the 90° position (valve fully closed).

Often, it is desirable to pretest actuators to determine their ability to withstand the dynamic and seating torque loads which the actuator is expected to experience in field operation. While it would be desirable to repeatedly subject an actuator, under test situations, to the full and varying torque loads to be experienced in the field, current methods for testing valve actuators, such as described in standard number Qual-ACT 003 of the ADAC Division of Anchor/Darling Industries, Inc., repeatedly subject the actuators to a maximum load without simulating the full range of loads.

SUMMARY OF THE INVENTION

It is an object of the present invention to provide an apparatus for testing valve actuators by subjecting the actuators to a cycle of torque loads which simulate the dynamic torque loads and seating torque loads the actuators would be expected to experience in field operation.

It is further object of the present invention to provide an apparatus for testing valve actuators which automatically and repeatedly simulate the torque loads expected to be experienced by an actuator operating to move a valve from a fully opened to a fully closed position and back to a fully opened position.

According to a preferred embodiment of the present invention, there is provided a test apparatus for subjecting a test valve actuator to a repeating cycle of torque loads which simulate the dynamic and seating torque loads the actuator would be expected to experience while opening and closing a butterfly-type valve in field operation. The apparatus includes a frame member supporting a drive shaft for rotation about a horizontal axis. The test actuator is mounted on the frame member and coupled to the drive shaft for rotating the shaft 90°.

A tail shaft having a horizontal axis is mounted on the frame and connected to the drive shaft by link chain engaging sprockets on the tail shaft and drive shaft. The sprockets are selected to have a 3 to 1 gear reduction ratio so the tail shaft rotates three degrees for each degree of rotation of the drive shaft.

A first mass is rigidly supported away from the tail shaft for rotation with the tail shaft. The first mass is selected to have a weight so the torque experienced by the tail shaft as it rotates the mass is one-third the dynamic torque expected to be experienced by the actuator during field operation. By reason of the 3 to 1 gear reduction, the torque load experienced by the actuator is three times the torque load experienced by the tail shaft.

A second mass is supported away from the tail shaft and mounted to pivot freely on the tail shaft. The second mass is selected to have a weight sufficient to produce a torque at the axis of rotation so the torque produced by the second mass plus the negative torque produced by the first mass equal one-third the seating torque experienced by an actuator in field operation. As the first mass rotates to a position corresponding to a valve fully closed position, the second mass is engaged with the actuator driving both masses and, by reason of the 3 to 1 gear ratio, the actuator is subjected to the expected seating torque load.

Circuitry is provided to repeatedly cycle the apparatus with the actuator driving from fully opened to fully closed and back to fully open.

DESCRIPTION OF THE PREFERRED EMBODIMENT

Figure 1:
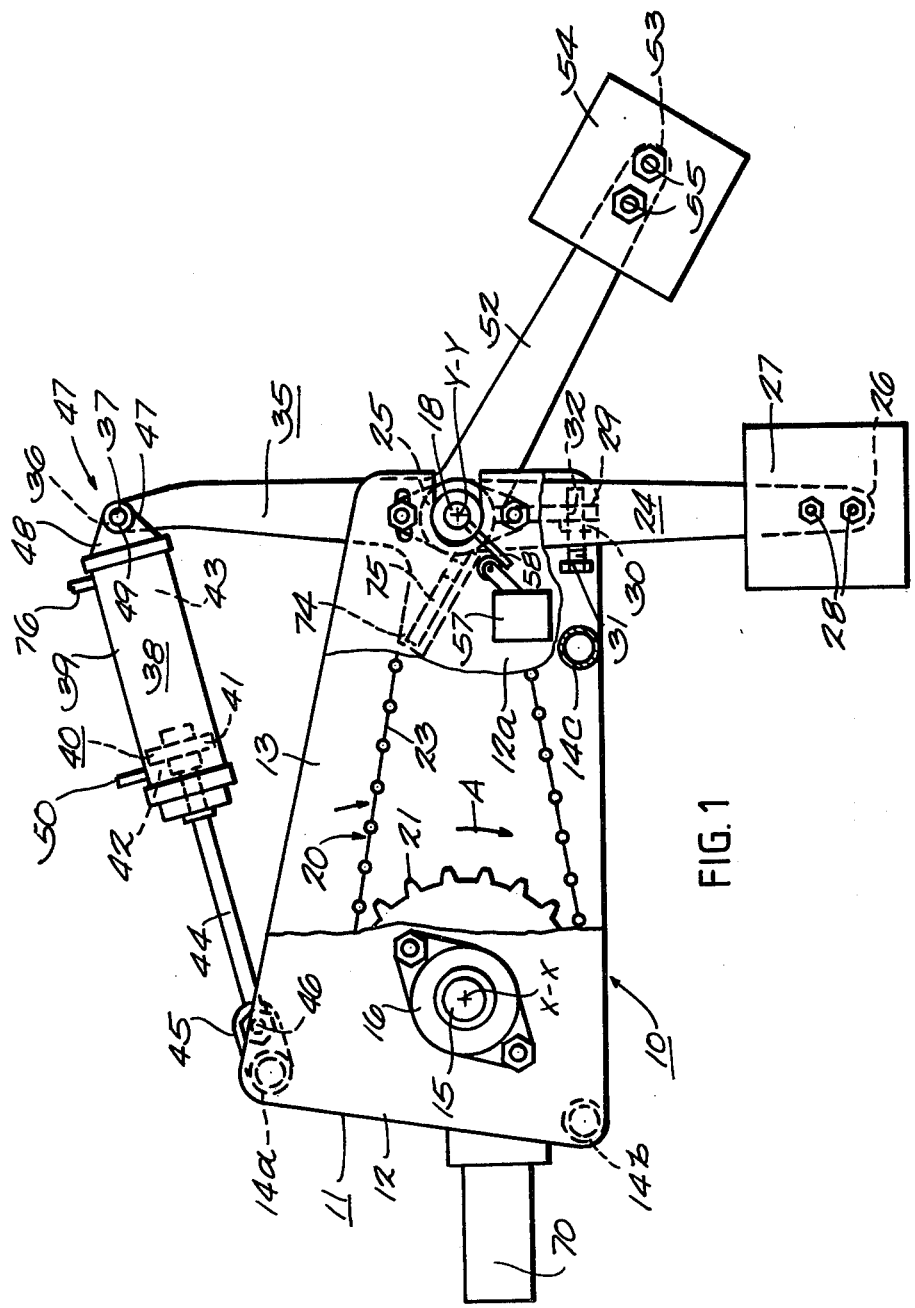
FIG. 1 is a side view, partially in section, of a test apparatus for valve actuators.
Figure 2:
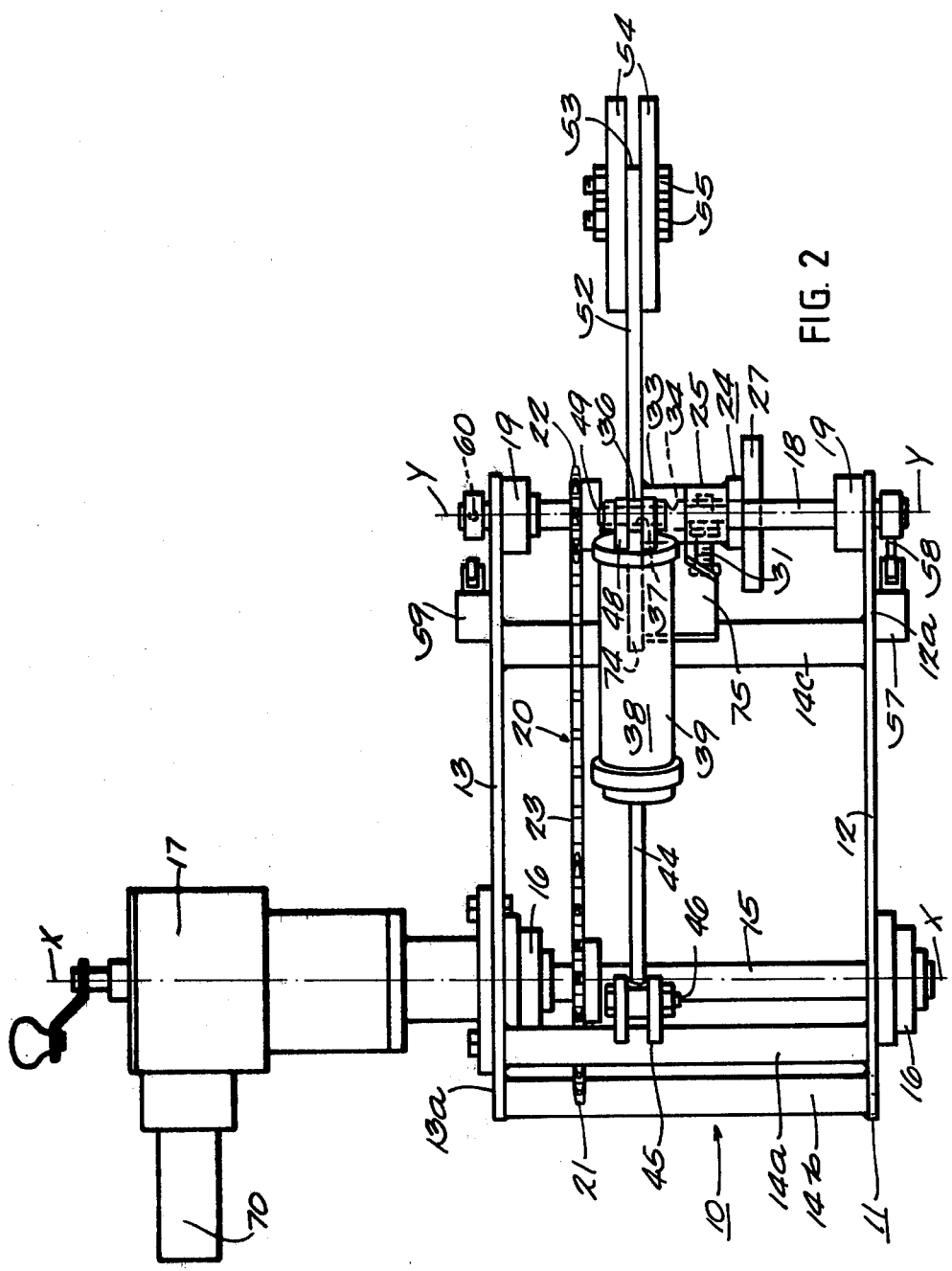
FIG. 2 is a top view of the test apparatus.

Referring now to the drawings and, in particular in FIGS. 1 and 2, a valve actuator test apparatus 10 is shown comprising a frame member 11 having a first vertical sidewall 12 and a second vertical sidewall 13 rigidly supported in spaced parallel relation by three cylindrical braces 14a, 14b and 14c. A drive shaft 15 extends through frame member 11 perpendicular to sidewalls 12, 13 and is supported in a first set of bearings 16 for rotation about a horizontal axis X—X. A test actuator 17 is mounted on an exterior surface 13a of second sidewall 13 and coupled to drive shaft 15 and operable to rotate drive shaft 15 in both a clockwise (indicated by the arrow, A, in FIG. 1) and counterclockwise direction through an angular displacement of 90°. Test actuator 17 is an electric motor driven actuator for opening and closing a butterfly-type valve.

A tail shaft 18 extends through sidewalls 12, 13 parallel to drive shaft 15 and is supported for rotational movement about its horizontal axis Y—Y by a second set of bearings 19. Drive shaft 15 and tail shaft 18 are motively connected by a gear system 20 comprising a first sprocket 21 fixed to drive shaft 15 and a second sprocket 22 fixed to tail shaft 18 with first sprocket 21 and second sprocket 22 engaged by a common link chain 23. First sprocket 21 and second sprocket 22 are selected to provide gear ratio of 3 to 1. That is, for each degree of rotation of drive shaft 15, tail shaft 18 is caused to rotate three degrees, A first lever arm 24 having a first end 25 secured to tail shaft 18 projects radially from tail shaft 18 to a second end 26. A first mass 27, fabricated from plate steel or the like, is removably secured to tail shaft 18 at second end 26 by a plurality of bolts 28. The distance of first mass 27 from tail shaft 18 and the weight of first mass 27 are selected to generate a potential torque load (calculated as the weight of mass 27 times its distance from axis Y—Y) equal to one-third the maximum dynamic torque load anticipated to be experienced by an actuator such as test actuator 17 in field operation. A plate member 29 is secured to first lever arm 24 on a side thereof remote from first sidewall 12 of frame 11 and occupies a plane extending radially from tail shaft 18. A threaded orifice 32 is provided through plate member 29. A threaded bolt 31 is received within orifice 32 and extends therethrough. A threaded nut 30 received upon bolt 31 and abutting plate member 29 secures bolt 31 in a fixed position relative to plate member 29.

A hub 33 having an axially extending bore 34 is provided with tail shaft 18 received within bore 34 and hub 33 freely pivotal about tail shaft 18. A support arm 35 is affixed to hub 33 and extends vertically therefrom (as shown in FIG. 1) terminating at a free end 36 which is provided with an orifice 37 therethrough. A pneumatic cylinder 38 is provided comprising a body portion 39 and piston 40. Piston 40 includes a piston head 41 which divides the interior of body portion 39 into a pressure chamber 42 and a vent chamber 43. A piston rod 44 extends from piston head 41 through pressure chamber 42 and is pivotally fixed by means of a pin 46 to a yoke member 45 affixed to cylindrical brace 14a. A yoke 48 is provided at a head end 47 of body portion 39 and is pivotally secured to support arm 35 by a pin 49 received within orifice 37 of support arm 35.

An air supply line 50 is connected to body portion 39 and is operable to supply air under pressure from a source (not shown) to pressure chamber 42. An air vent 76 permits free passage of air between ambient atmosphere and vent chamber 43. Pneumatic cylinder 38 is selected to have a stroke such that piston rod 44 is fully extended from body portion 39 when support arm 35 is vertical (as shown in FIG. 1). A solenoid valve 56, schematically shown in FIG. 7, is selectively operable (as will be described) to permit air to flow under pressure to supply line 50 and, alternately, to permit air under pressure within pressure chamber 42 to exhaust through line 50 to ambient atmosphere.

Hub 33 is additionally provided with a second lever arm 52 affixed to hub 33 and extending radially therefrom away from tail shaft 18 and 30° below horizontal when support arm 35 is vertical (referred to as rest position and as shown in FIG. 1). Second lever arm 52 has a free end 53 remote from hub 33 with a second mass 54 removably secured to free end 53 of arm 52 by a plurality of bolts 55. The distance of second mass 54 from tail shaft 18 and the weight of second mass 54 are selected to generate a potential torque load (calculated as the weight of mass 54 times its distance from axis Y—Y) so the potential torque load of mass 54 less the absolute value of the potential torque load of first mass 27 equals one-third the maximum seating torque load anticipated to be experienced by an actuator, such as test actuator 17 in field operation. A tail arm 74 is affixed to hub 33 and extends radially therefrom opposite second lever arm 52. Tail arm 74 is provided with a striking plate 75 affixed thereto on a side of tail arm 74 remote from second sidewall 13 and lying in a plane radial to axis Y—Y. Striking plate 75 extends from tail arm 74 a distance sufficient to permit striking plate 75 to be in contact with threaded bolt 31 when plate member 29 of first lever arm 24 is in overlying relation to striking plate 75 (as will be described).

A first normally open limit switch 57 is mounted on exterior surface 12a of first sidewall 12. A first contact pin 58 radially extending from tail shaft 18 operates to close limit switch 57 when first lever arm 24 is in a position with lever arm 24 extending vertically beneath tail shaft 18 (as shown in FIG. 1). A second normally open limit switch 59 is mounted on exterior surface 13a of sidewall 13. A second contact pin 60, radially extending from tail shaft 18 operates to close limit switch 59 when first lever arm 24 is in a horizontal position extending from tail shaft 18 toward drive shaft 15.

Figure 7:
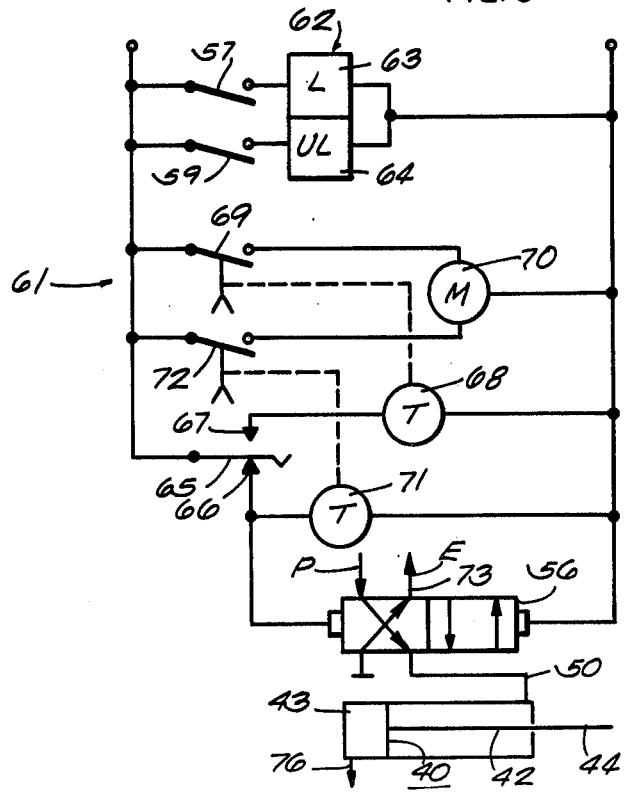
FIG. 7 is a schematic showing of circuitry to operate the apparatus.

FIG. 7 is a schematic showing of a circuit 61 to operate test apparatus 10. Circuit 61 includes first limit switch 57 and second limit switch 59 both shown in their normally open states (i.e., not permitting current to flow across the switches). Circuit 61 also includes solenoid valve 56 shown in a normally de-energized stated position (when de-energized no current is flowing to solenoid valve 56 with valve 56 permitting air to pass from compression chamber 42 rather than supplying air under pressure to chamber 42).

Circuit 61 further includes a contact relay 62 having a first coil 63 and a second coil 64. Contact relay 62 is arranged so the first coil 63 receives a current and is energized when first limit switch 57 is closed and second coil 64 receives a current and is energized when second limit switch 59 is closed. Contact relay 62 is a latching-type relay so the relay 62 is latched when first coil 63 (indicated by L) is energized and remains latched after first limit switch 57 opens until second coil 64 (indicated by UL) is energized at which point relay 62 unlatches. Contact relay 62 has a contact terminal 65 which assumes a position closing a circuit to a first contact 66 when relay 62 is unlatched (as shown in FIG. 7). When relay 62 is latched, contact terminal opens the circuit to first contact 66 and closes a circuit to a second contact 67. It will be appreciated that latching circuit relays such as relay 62 and contact terminal 65 are commercially available items such as a permanent magnet latch relay, model number 700-Nm 200 manufactured by the Allen-Bradley Company of Milwaukee, Wis.

Circuit 61 is provided with a first timer relay having a first timer 68 and a normally open first timer switch 69. First timer is operable to receive a current from second contact 67 when contact terminal 65 closes a circuit with second contact 67. First timer 68 is selected, so after a first preselected period of time after initially receiving current, first timer 68 causes first timer switch 69 to close and remain closed until no current is received by first timer 68. First timer switch 69 is connected to a motor 70 of actuator 17 operable to cause actuator 17 to rotate drive shaft 15 toward a valve fully closed position (counterclockwise in the view of FIG. 2) when first timer switch 69 is closed.

A second timer relay is provided as having a second timer 71 and a second normally open timer switch 72. Second timer 71 is operably connected to first contact 66 to receive a current when contact terminal 65 closes a circuit with first contact 66. Second timer 71 is selected so, after a second preselected period of time, second timer 71 causes second timer switch 72 to close and remain closed until no current is received by second timer 71. Second timer switch 72 is operably connected to motor 70 which operates to cause actuator 17 to rotate drive shaft 15 toward a valve fully opened position (clockwise as indicated by the arrow, A, in FIG. 1) when second timer switch 72 is closed.

Solenoid valve 56 is provided as operable to receive a current and energize when contact terminal 65 closes a circuit to first contact 66. Solenoid valve 56 when in an energized state, schematically shown in FIG. 7, operates air to flow under pressure from a source (not shown) through air supply line 50 to pressure chamber 42. Solenoid valve 56 is selected so, when valve 56 is de-energized by reason of contact terminal 65 opening the circuit to first contact 66, air under pressure is permitted to pass from pressure chamber 42 through line 50 to an exhaust vent 73.

It will be appreciated that timer relays and solenoid valves such, as discussed and schematically shown, form no part of this invention, per se, and are all commercially available items.

The operation of the test apparatus 10 will be described by way of a preferred example for testing an electric motor driven test actuator 17 expected to be operating in the field under a maximum dynamic torque load of 1400 inch-pounds and under a maximum seating torque load likewise of 1400 inch-pounds. Such an actuator may be actuator model MOV90000 manufactured by the Tri-Tech Company of Renton, Wash. First lever arm 24 and second lever arm 52 are both selected to be 13.5 inches in length with first mass 27 selected to have a weight of approximately 34.6 pounds and second mass 54 selected to have a weight of approximately 69.2 pounds. As can be seen, first mass 27 generates a maximum torque of approximately 467 inch-pounds or one-third the maximum dynamic torque load. Also, second mass 54 generates a maximum torque of approximately 934 inch-pounds which, when added with the torque of first mass 27 when first mass 27 is generating a maximum negative torque, presents a torque load equal to one-third the maximum seating torque load or 467 inch-pounds. In a preferred example, first timer is selected to have a time delay of approximately 10 seconds and second timer is selected to have a time delay of approximately 60 seconds. The selected time delays are intended to simulate an actuator maintaining a valve at fully opened and fully closed positions, respectively.

In the initiation of operation, first lever arm 24 is in a position extending vertically beneath tail shaft 18, as depicted in FIG. 1, with first contact pin 58 engaging and closing first limit switch 57. Second limit switch 59 is in an opened position. In the position shown in FIG. 1, no torque load is being transmitted to the actuator 17 simulating an operating condition where an actuator is maintaining a valve at fully opened position.

With first limit switch 57 closed, first coil 63 of contact relay 62 is energized latching contact terminal 65 in a position closing a circuit to second contact 67 and opening a circuit to first contact 66. Consequently, second timer 71 is de-energized as is solenoid valve 56 causing pneumatic cylinder 38 to be unpressurized. With pneumatic cylinder 38 unpressurized, support arm 35 is vertical and second lever arm 52 assumes a rest position at 30° below horizontal as shown in FIG. 1. With contact terminal 65 closing a circuit to second contact 67, a current passes to first timer 68 which, after ten seconds, closes first timer switch 69 resulting in actuator 17 rotating drive shaft 15 in a counterclockwise direction toward a valve fully closed position.

As drive shaft 15 rotates counterclockwise, gear system 20 drives tail shaft 18 to rotate counterclockwise which, due to the 3 to 1 gear reduction, rotates three degrees for each degree of rotation of drive shaft 15. As tail shaft rotates, first contact pin 58 rotates away from first limit switch 57 with first limit switch 57 assuming its normally open position. Contact relay 62, being of a latching variety, maintains contact terminal 65 closing a circuit to second contact 67 when first limit switch 57 opens thereby maintaining solenoid valve 56 de-energized and maintaining the actuator 17 rotating drive shaft 15 counterclockwise.

As tail shaft 18 rotates, first mass 27 secured to first lever arm 24 moves upwardly in a counterclockwise direction exerting a continuously increasing torque load on tail shaft 18. Gear system 20 transmits the torque load to drive shaft 15 and actuator 17, which due to the 3 to 1 gear ratio, experiences a dynamic torque load which has been proportionally translated to equal three times the torque load experienced by tail shaft 18. Second lever arm 52 secured to hub 33 which pivots freely on tail shaft 18 does not rotate and does not contribute to the torque load experienced by actuator 17.

Figure 3:
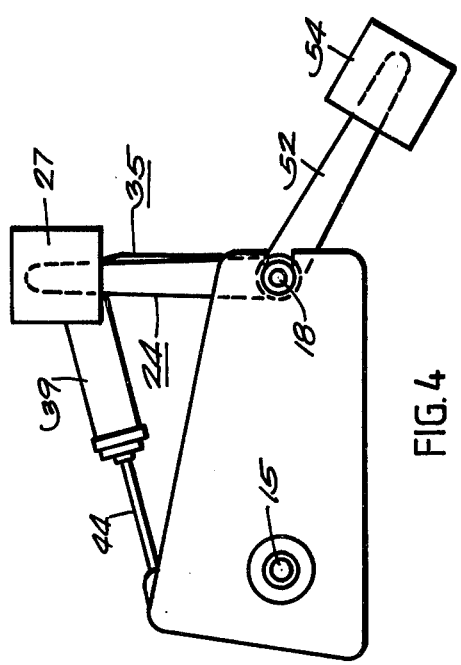
FIG. 3 is a view of a first lever arm and second lever arm in a position corresponding to a valve at 30° from open.

After actuator 17 has rotated drive shaft 15 a total of 30° (the angle at which an actuator in field operation would experience the maximum dynamic torque load of 1400 inch-pounds), tail shaft 18 has rotated 90° with first lever arm 24 extending horizontally away from drive shaft 15 (as depicted in FIG. 3). With first lever arm 24 horizontal, the maximum torque load potential of first mass 27 (or 465 inch-pounds) is experienced by tail shaft 18 and transmitted to actuator 17 after being tripled to equal the maximum dynamic torque load (1400 inch-pounds).

Figure 4:
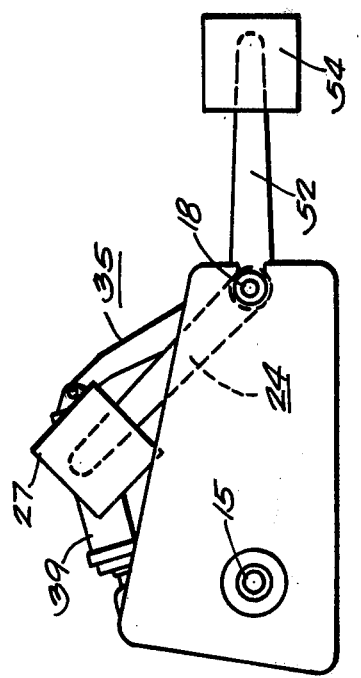
FIG. 4 is a view of the first lever arm and second lever arm in a position corresponding to a valve at 60° from open.

As actuator 17 rotates drive shaft 15 an additional 30°, tail shaft 18 rotates an additional 90° to a position with first lever arm 24 extending vertically above tail shaft 18 (as depicted in FIG. 4). As lever arm rotates to the vertical position, the torque load experienced by actuator 17 is proportionally reduced from maximum dynamic torque load to zero.

As actuator 17 continues to rotate drive shaft 15 toward valve fully closed position, first lever arm 24 moves from its vertical position toward horizontal projecting toward drive shaft 15 resulting in a negative torque load simulating flow of fluid in a conduit urging a valve disc toward a closed position. Actuator 17 must now resist the lowering forces of first lever arm 24.

After actuator 17 has rotated drive shaft 15 a total of 80° (10° from valve fully closed position representing the position at which the valve begins to contact a valve seat), first lever arm 24 has rotated a total of 240° to a position of 30° up from horizontal. At this position, threaded bolt 31 extending through plate member 29 contacts striking plate 75 with bolt 31 urging plate 75 to move downwardly with a corresponding upward movement of second lever arm 52. Second mass 54 generating a torque load resisting upward motion greater than the torque load generated by first mass 27 encouraging downward motion causes the actuator 17 to experience an increasing torque load as first lever arm 24 and second lever arm 52 simultaneously move toward horizontal positions as depicted in FIG. 5.

Figure 5:
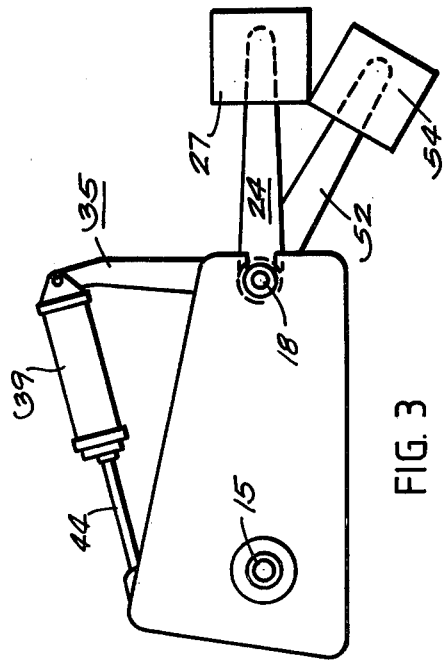
FIG. 5 is a view of the first lever arm and second lever arm in a position corresponding to a valve at fully closed position.

When arm 24 and arm 52 attain the position depicted in FIG. 5, the actuator 17 has rotated drive shaft 15 a total of 90° to valve fully closed position and tail shaft 18 has rotated a total of 270°. Tail shaft 18 experiences a net torque load equal to the maximum potential torque load of second mass 54 (934 inch-pounds) plus the torque load being generated by first mass 27 (a minus 467 inch-pounds) which, when transmitted to the actuator, proportionally translates to the maximum seating torque load (1400 inch-pounds). Further at this position, support arm 35 has rotated 30° pushing pneumatic cylinder 38 to a position with piston rod 44 fully retracted within body portion 39.

When first lever arm 24 is horizontal toward drive shaft 15, second contact pin 60 engages second limit switch 59 closing second limit switch 59. When closed, second limit switch 59 permits current to pass to second coil 64 of contact relay 62 unlatching relay 62. When unlatched, relay 62 causes contact terminal to open the circuit to second contact 67 and close the circuit to first contact 66. With the circuit to second contact 67 opened, first timer 68 is de-energized and first timer switch 69 opens causing the motor 70 to stop.

With the circuit to first contact 66 closed, second timer 71 and solenoid valve 52 are energized. When energized, solenoid valve 52 permits air under pressure to flow through supply line 50 to pressure chamber 42 locking piston 40 in a fully retracted position and, consequently, locking second lever arm 52 in a horizontal position. Sixty seconds after being energized, second timer 71 causes second timer switch 72 to close passing current to motor 70 causing actuator 17 to rotate drive shaft in a clockwise direction toward valve fully opened position.

Figure 6:
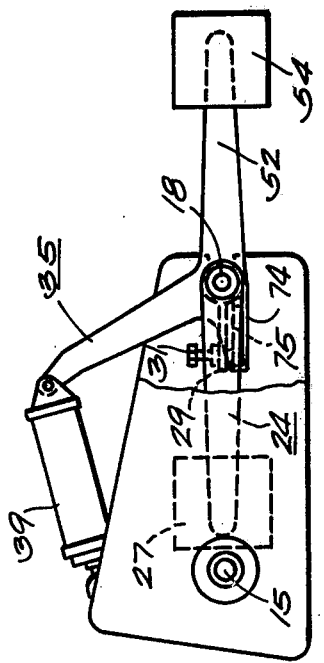
FIG. 6 is a view of the first lever arm and second lever arm in a position corresponding to a valve beginning to move to fully opened position from fully closed position.
Figure 8:
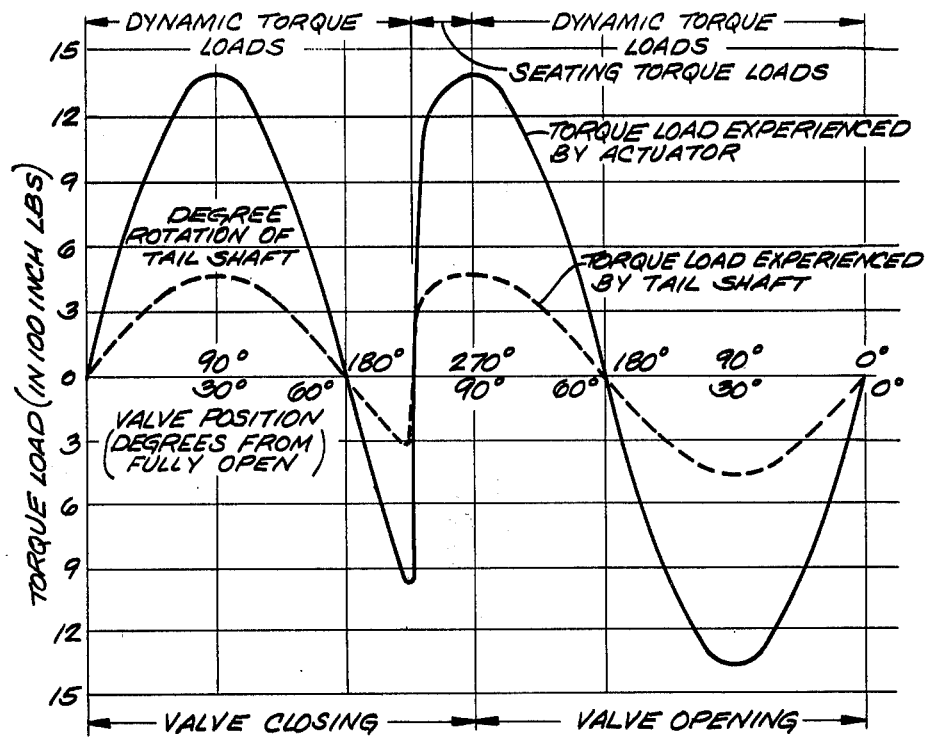
FIG. 8 is a graphic showing of the simulated loads experienced by an actuator during testing.

As shown in FIG. 6, when drive shaft 15 rotates toward valve fully opened position, second lever arm 52 remains fixed by reason of pneumatic cylinder 38 and tail shaft 18 rotates within hub 33. As tail shaft 18 rotates 90° with first lever arm 24 moving to vertically above tail shaft 18, actuator 17 experiences dynamic torque loads ranging from maximum dynamic torque load and decreasing to zero torque load.

As drive shaft 15 rotates an additional 30°, tail shaft 18 rotates an additional 90° with first lever arm 24 rotating from vertical to horizontal with the actuator 17 experiencing dynamic torque loads ranging from zero to maximum negative dynamic torque load simulating the fluid flow in a conduit attempting to urge a valve to fully opened position. Finally, as drive shaft 15 rotates an addition 30° to valve fully opened position, tail shaft 18 rotates an additional 90° with first lever arm 24 rotating from horizontal to vertically below tail shaft 18 with actuator 17 experiencing torque loads ranging from maximum negative dynamic torque load to zero load.

After the drive shaft 15 has rotated a total of 90° with tail shaft 18 rotating a corresponding 270° with first lever arm 24 vertically below tail shaft 18, first contact pin 58 engages and closes first limit switch 57. With first limit switch 57 closed, first coil 63 of contact relay 62 is energized causing relay 62 to latch with contact terminal 65 opening the circuit to first contact 66 and closing the circuit to second contact 67. With the circuit to first contact 66 open, the second timer 72 de-energizes opening second timer switch 72 and stopping motor 70. Further, solenoid valve 52 de-energizes with air passing from pressure chamber 42 and second lever arm 52 dropping from horizontal to the rest position 30° below horizontal as shown in FIG. 1. With a current passing to second contact 67, first timer 68 is energized causing the above described cycle of operation to repeat.

FIG. 7 graphically depicts the torque loads experienced by the actuator 17 and tail shaft 18 as the actuator 17 rotates drive shaft 15 from valve fully opened position (signified as 0°) to valve fully closed position (90°) and back to valve fully opened position (0°). The numerals below the abscissa of the graph indicate the position of drive shaft 15 measured as degrees from fully opened position. The numerals above the abscissa represent the amount of rotation of tail shaft 18 for corresponding degrees of rotation of drive shaft 15. The ordinate of the graph represents the torque loads experienced by the actuator 17 (solid line) and tail shaft 15 (dashed line) for corresponding values on the abscissa.

From FIG. 7, it can be seen the test actuator 17 is subjected to a full cycle of dynamic torque loads and seating torque loads which simulate the loads an actuator would experience in field operation. It will be appreciated the nature of the loads to which the test actuator 17 is subjected may be easily varied by using a first mass 27 and second mass 54 of differing weights than those used in the above example. Further, it will be appreciated that the position at which seating torque loads are initiated may be easily varied by adjusting treaded bolt 31 to engage striking plate 75 when first lever arm 24 is at a position above or below the position given in the above example.

From the foregoing detailed description of the present invention, it has been shown how the objects of the invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims as are, or may hereafter be, appended hereto.

The embodiments of the invention in which an exclusive property or privilege is claimed are defined as follows:

1. An apparatus for subjecting a test actuator to torque loads which simulate torque loads experienced by an actuator while operating a butterfly-type valve between a valve fully opened position and a valve fully closed position in a fluid conduit where the torque loads to be simulated include a dynamic torque load experienced by the actuator by reason of fluid flow against the valve within the conduit as the valve moves between fully opened position and fully closed position, and a seating torque load experienced by the actuator as the valve moves from a position at which the valve begins to contact a valve seat to said fully closed position; the apparatus comprising:

a first mass supported away from a horizontal axis for rotation about said axis; said first mass being of a preselected weight and displacement from said axis to generate a first cyclic torque load at said axis proportional to said dynamic torque load as said first mass rotates from a first position corresponding to said valve fully opened position to a final position corresponding to said valve fully closed position;

a second mass supported away from a horizontal axis for rotation about said axis operable to rotate from a rest position to an end position as said first mass rotates from a valve seating position corresponding with said position at which a valve begins to contact a valve seat to said final position; said second mass being of a preselected weight and displacement from said axis to generate a second cyclic torque load such that a sum of said first cyclic torque load and said second cyclic torque load is proportional to said seating torque load as said first mass rotates from said valve seating position to said final position;

means for transmitting said first cyclic torque load to said test actuator with said first cyclic torque load proportionally translated to approximate said dynamic torque load; and, means for transmitting said second cyclic torque load to said test actuator as said first mass rotates from said valve seating position to said final position with said first cyclic torque load and said second cyclic torque load summed and the sum of said loads proportionally translated to approximate said seating torque load.

2. An apparatus according to claim 1 comprising:

a circuit having first means for detecting said first mass in said final position and second means responsive to said first means for reversing said rotation of said first mass to rotate from said final position to said first position; and, means for supporting said second mass in said end position as said first mass rotates from said final position to said first position without said second mass transmitting a torque load to said test actuator.

3. An apparatus according to claim 2 wherein said circuit includes:

third means for detecting said first mass in said first position;

fourth means responsive to said third means to further reverse said rotation of said first mass to rotate from said first position to said final position; and fifth means responsive to said third means for terminating said support of said second mass permitting said second mass to rotate to said rest position.

4. An apparatus according to claim 3, wherein said first mass rotates about a horizontal axis in common with said second mass.

* * * * *